(12) United States Patent
Karg et al.

(10) Patent No.: US 11,132,530 B2
(45) Date of Patent: Sep. 28, 2021

(54) METHOD FOR THREE-DIMENSIONAL GRAPHIC RECONSTRUCTION OF A VEHICLE

(71) Applicant: Conti Temic microelectronic GmbH, Nuremberg (DE)

(72) Inventors: Michelle Karg, Lindau (DE); Olga Prokofyeva, Friedrichshafen (DE); Christian Scharfenberger, Lindau (DE); Robert Thiel, Niederstaufen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 110 days.

(21) Appl. No.: 16/508,744

(22) Filed: Jul. 11, 2019

(65) Prior Publication Data

US 2020/0026905 A1 Jan. 23, 2020

(30) Foreign Application Priority Data

Jul. 19, 2018 (DE) ...................... 10 2018 212 049.8

(51) Int. Cl.
*G06K 9/00* (2006.01)
*G06K 9/46* (2006.01)

(52) U.S. Cl.
CPC ..... *G06K 9/00208* (2013.01); *G06K 9/00791* (2013.01); *G06K 9/4604* (2013.01)

(58) Field of Classification Search
CPC .......... G06K 9/00208; G06K 9/00791; G06K 9/4604
See application file for complete search history.

(56) References Cited

U.S. PATENT DOCUMENTS

| | | | |
|---|---|---|---|
| 7,409,092 B2 * | 8/2008 | Srinivasa | G06K 9/3241 382/103 |
| 2014/0152827 A1 * | 6/2014 | Yamamoto | G06T 3/4038 348/148 |
| 2020/0394472 A1 * | 12/2020 | Jia | G06K 9/6265 |

OTHER PUBLICATIONS

Betke, Margrit, Esin Haritaoglu, and Larry S. Davis. "Real-time multiple vehicle detection and tracking from a moving vehicle." Machine vision and applications 12.2 (2000): 69-83. (Year: 2000).*
Rezaei, Mahdi, Mutsuhiro Terauchi, and Reinhard Klette. "Robust vehicle detection and distance estimation under challenging lighting conditions." IEEE transactions on intelligent transportation systems 16.5 (2015): 2723-2743. (Year: 2015).*

(Continued)

*Primary Examiner* — Pinalben Patel
(74) *Attorney, Agent, or Firm* — W. F. Fasse (57) ABSTRACT

A method for the three-dimensional graphic or pictorial reconstruction of a vehicle begins with capturing an image of at least one vehicle with a camera. A first rectangular border of the entire vehicle is captured in the image, to obtain a first rectangle. A second rectangular border of one side of a vehicle is captured in the image, to obtain a second rectangle, and it is determined whether the first and second rectangles are borders which relate to the same vehicle. If so, then it is determined whether a side orientation of the vehicle can be assigned from the two rectangles and, if so, the side orientation is determined. Finally, a three-dimensional reconstruction of the vehicle is performed from the first rectangle, the second rectangle and the side orientation.

8 Claims, 5 Drawing Sheets

(56) References Cited

OTHER PUBLICATIONS

Tuermer, Sebastian, et al. "Airborne vehicle detection in dense urban areas using HoG features and disparity maps." IEEE Journal of Selected Topics in Applied Earth Observations and Remote Sensing 6.6 (2013): 2327-2337. (Year: 2013).*
German Examiner Sebastian Huissmann, German Search Report for German Patent Application No. 10 2018 212 049.8, dated Jan. 23, 2019, 8 pages, German Patent and Trademark Office, Muenchen, Germany, with partial English translation, 6 pages.
Henry Schneiderman et al., "A Statistical Method for 3D Object Detection Applied to Faces and Cars", Proceedings IEEE Conference on Computer Vision and Pattern Recognition, CVPR 2000 (Cat. No. PR00662), Jun. 15, 2000 [online], DOI: 10.1109/CVPR.2000.855895, 6 pages.

* cited by examiner

METHOD FOR THREE-DIMENSIONAL GRAPHIC RECONSTRUCTION OF A VEHICLE

FIELD OF THE INVENTION

The invention relates to a method for the three-dimensional graphic or pictorial reconstruction of a vehicle. The invention additionally relates to a system for performing the method, and a vehicle having such a system.

BACKGROUND INFORMATION

An essential aspect in the field of autonomous driving and driver assistance systems is the recognition of road traffic scenes. The prerequisite for this is recognizing vehicles in images which are captured by cameras in or on the vehicle.

As a general rule, the recognition of vehicles for road traffic scenes based on camera data uses the two-dimensional detection of so-called bounding boxes, that is to say rectangles which encompass the object. In addition, approaches for the pixel-precise detection of vehicles exist. However, in order to capture the street scene completely, three-dimensional structures are required.

Current approaches therefore involve the recognition of such 3D structures of objects. These also include approaches which are based on other sensors such as LIDAR (LIght Detection And Ranging) or stereo approaches which are based on using more than one camera.

The approaches to estimating a three-dimensional structure from image data require a considerable amount of additional work annotating the data, in order to annotate, for example, a precise 3D structure such as tires, window panes, etc. in the image, as is the case, for example, with the so-called "Deep MANTA" approach.

Simple and fast approaches with bounding boxes are either based on a single 2D bounding box and a so-called "ground plane assumption", in which the vehicle is located on a plane which is not inclined, or multiple bounding boxes for the various side views.

SUMMARY OF THE INVENTION

An object of the invention is to provide a simple and effective recognition of three-dimensional objects in the field of autonomous driving or driver assistance systems.

The object can be achieved by a method, a system and a vehicle according to several aspects of the invention as set forth herein.

The present invention deals with the reconstruction of the three-dimensional structure of vehicles based on the use of a single camera and single shots/images of said camera. In contrast to stereo approaches or the use of LIDAR sensors, this is an inexpensive approach.

According to one aspect, a method for the three-dimensional graphic or pictorial reconstruction of a vehicle is provided, having the steps of:
capturing an image of at least one vehicle with a camera,
capturing a first rectangular border of the entire vehicle in the image, in order to obtain a first rectangle,
capturing a second rectangular border of one side of a vehicle, e.g. of the front or rear side or lateral face of a vehicle from the viewpoint of the camera, in the image, in order to obtain a second rectangle,
determining whether the first and the second rectangle are borders which relate to the same vehicle,
determining whether a side orientation of the vehicle can be assigned from the two rectangles, if the first and the second rectangle are borders which relate to the same vehicle,
determination of the side orientation if a side orientation can be determined,
performing a three-dimensional reconstruction of the vehicle from the first rectangle, the second rectangle and the side orientation.

The method is consequently based on an image which has preferably been acquired with only one camera and is evaluated. For example, the visible sides of objects such as e.g. vehicles are detected, and a rectangle is constructed around these faces. The visible sides are, for example, the complete front side of an oncoming vehicle, including e.g. wheels and windscreen, or the complete rear side of a vehicle driving in front, if the camera is forward-facing. A further rectangle is placed around the entire vehicle. This also includes the front or respectively rear side which is, in each case, visible in the image, as well as the visible lateral faces.

However, it is also possible that a rectangle is formed over a non-visible side from e.g. a visible edge.

The capturing of a second rectangular border of one side of a vehicle can e.g. relate to a) the front side of a vehicle from the viewpoint of the camera, b) the rear side of a vehicle from the viewpoint of the camera, c) the right side or respectively lateral face of a vehicle (600) from the viewpoint of the camera, and/or d) the left side or respectively lateral face of a vehicle (600) from ¸he viewpoint of the camera in the image, in order to obtain a second rectangle (202).

Consequently, other or further, i.e. more than two, rectangles can be detected such as e.g. one that borders one side of the vehicle or one that borders the rear side of the vehicle, which is detected e.g. from the rear visible, vertical edge of the vehicle.

Since several vehicles can be depicted in the image, which can as also overlap, the rectangles are to first be assigned to one another such that e.g. one rectangle for the front or respectively rear side is assigned to the rectangle of the entire, same vehicle.

Here, vehicles are e.g. bicycles, trucks, trams, passenger vehicles or camper vans, etc.

According to an embodiment, the determining whether the first and the second rectangle are borders which relate to the same vehicle comprises the calculation of a first value which indicates the ratio of the common area of the first and of the second rectangle to the area of the second rectangle, and the first and the second rectangle are then determined to be borders which relate to the same vehicle if the first value exceeds a first threshold.

Consequently, the quotient is formed from the intersection of the areas of the two assigned rectangles and the area of the rectangle of the front or respectively rear side of the vehicle. This quotient is used as a measure for the assignment. The higher this value is, the higher the probability is that the two rectangles relate to the same vehicle. If this value exceeds a predetermined threshold, the rectangles are assigned to one another and the next step of the method can be executed.

During this next step, which is executed if the threshold for the rectangle assignment has been exceeded, it is checked whether the rectangles assigned to one another are located with respect to one another such that a clear determination of which side of the vehicle is depicted in the image is possible. The term 'side' means the left or right side of the vehicle, e.g. from the camera viewpoint. This is not possible for the rectangle determination, for example due to errors and inaccuracies in the image analysis, if the lateral faces are too small because of the perspective; i.e. for example in the case of a virtually frontal perspective of the vehicle.

According to an embodiment, the determining of whether a side of the vehicle can be assigned from the two rectangles, comprises the determination of a second value which indicates the ratio of the common area of the first and second rectangles relative to the sum of the areas of the first and second rectangles, and a side orientation is then deemed to be determinable if the second value falls below a second threshold.

Here, the quotient is therefore formed from the intersection of the two rectangles with the total area, which consequently constitutes a relative measure of the size of, for example, the visible lateral face. In other words, the more laterally a vehicle is depicted in an image, the smaller the front rectangle becomes and, consequently, the intersection, on the one hand, and the larger the rectangle of the entire vehicle becomes, provided that the vehicle is longer than it is wide. Finally, if this ratio falls below a threshold, it is assumed that a side can be safely determined. Which side of the vehicle can be seen in the image, i.e. the side orientation, can be determined based on the location of the two rectangles with respect to one another.

After it has been established that a side orientation can be determined and as soon as said side orientation has been determined, the three-dimensional reconstruction of the vehicle can be performed.

According to an embodiment, the performing of a three-dimensional reconstruction of the vehicle comprises the determining of the rear or respectively front face from the viewpoint of the camera by a projection of the front or respectively rear face, wherein the direction of the projection is effected, taking into account the side orientation; and comprises the determining of the lateral faces by connecting the corners of the front or respectively rear face to the corners of the rear or respectively front face.

The vehicle in the image has e.g. a perspective alignment, which can be taken into account by means of a projection of the front rectangle from the viewpoint of the camera onto a non-visible rear rectangle which is to be constructed. The alignment is in particular determined by the sizes of the objects in the image and the focal length of the camera, as explained in further detail below. As soon as the rear rectangle which is not visible in this example is constructed, the lateral as well as the upper and lower faces can be constructed by connecting the corresponding corners of the front and rear rectangle.

According to an embodiment, the determining of the rear or respectively front face comprises the determination of an angle between the lower edge of the front or respectively rear rectangle of an adjacent line of a lower corner of the front or respectively rear rectangle and the corresponding corner of the rear or respectively front rectangle.

The angle can be determined e.g. trigonometrically from knowledge or assumptions regarding the vehicle length or vehicle width and the rectangle sizes. The knowledge of the vehicle sizes can be provided e.g. by means of a vehicle type recognition from this or other camera data, or e.g. by means of a car-to-car connection. As a result, further sizes, such as e.g. the longitudinal difference in distance from the rear face of the vehicle to the front face of the vehicle can be calculated.

According to an embodiment, the determining of the rear or respectively front face comprises calculating the height of the rear or respectively front rectangle, wherein the height is calculated from the same ratio of the focal length of the camera to the length of a lateral rectangular edge of the first or respectively second rectangle, on the one hand, and the distance of the camera from the vehicle and the estimated real front or respectively rear height of the vehicle, on the other hand. Finally, all the corners of the rear rectangle can be determined and the corresponding vertices can be connected to one another and the 3D reconstruction can be completed.

If more than two rectangles are used, appropriate criteria can be applied. For example, the rectangles of the rear face and the total area or respectively of the front face and the total area can be assigned in each case, in pairs, to a vehicle, and the pairs having a common area rectangle can be sought. The orientation can be estimated in pairs in a similar way. If there are more than two rectangles, plausibility checks are consequently possible, on the one hand and, on the other hand, errors can be reduced e.g. by averaging.

According to a second aspect, a system for the three-dimensional pictorial reconstruction of a vehicle is provided, which has a camera for capturing an image having at least one vehicle, and a computing unit for performing the method described above.

According to a third aspect, a vehicle is provided which has a system as described above.

BRIEF DESCRIPTION OF THE DRAWINGS

Exemplary embodiments of the invention are explained in greater detail below, with reference to the schematic drawing, wherein.

DETAILED DESCRIPTION OF EXAMPLE EMBODIMENTS OF THE INVENTION

Below, the rectangles encompassing the front side, rear side, or the entire vehicle are also referred to by the term "bounding box" which is used in technical language.

The reconstruction of the 3D structure of vehicles based on a bounding box which comprises the entire car, and a second bounding box which comprises the rear or front section of a car, goes beyond the previous approaches, since
minimal annotating work is required,
the number of two boxes for reconstructing the 3D view is minimal,
so-called "IoA"- and "IoU" criteria are introduced in order to link associated bounding boxes in the image, and an estimation of the vehicle orientation based on the 3D reconstruction is made possible.

This method can be extended by the detection of side boxes: The detection of side boxes can be used as an alternative calculation instead of the front/rear sections, e.g. if the side view is more visible in the image than the front/rear section, or as an additional estimation in order to improve the accuracy of the calculation.

This method can be implemented, by way of example, with Convolutional Neural Networks (CNNs) as the detector or with traditional feature-based detectors such as HOG (Histogram of Oriented Gradients). This makes possible an implementation of the 3D and orientation estimation which is economical in terms of computation.

The majority of the object detectors only estimate the 2D structure of objects in images. These are represented either by means of 2D bounding boxes or by pixel-precise annotation of objects. No 3D orientation can be derived from this. Initial methods which are based on detailed 3D structures such as car model, tires, doors, etc., require a considerable amount of annotation work, in order to train algorithms which estimate the 3D boxes with machine learning. In addition, these methods are often computation-intensive. The proposed invention requires a small amount of annotation work and is economical in terms of computation.

The invention can be connected to any object detectors. It has been prototypically tested, for example, for CNNs, but can also be used for other object detectors such as HOG-based detectors. It can consequently be used for various object detectors and is not limited to, for example, a specified CNN architecture, as is the case with other methods.

The 3D bounding box estimation and orientation estimation for vehicles are based on the images of a camera in road traffic for single images.

The invention is explained below with reference to an example, in which a front side and a visible side of the vehicle from the viewpoint of the camera is bordered with a first rectangle, and the front side from the viewpoint of the camera is bordered with a second rectangle. Detection and processing of other or additional sides would take place in a similar manner.

Figure 1:
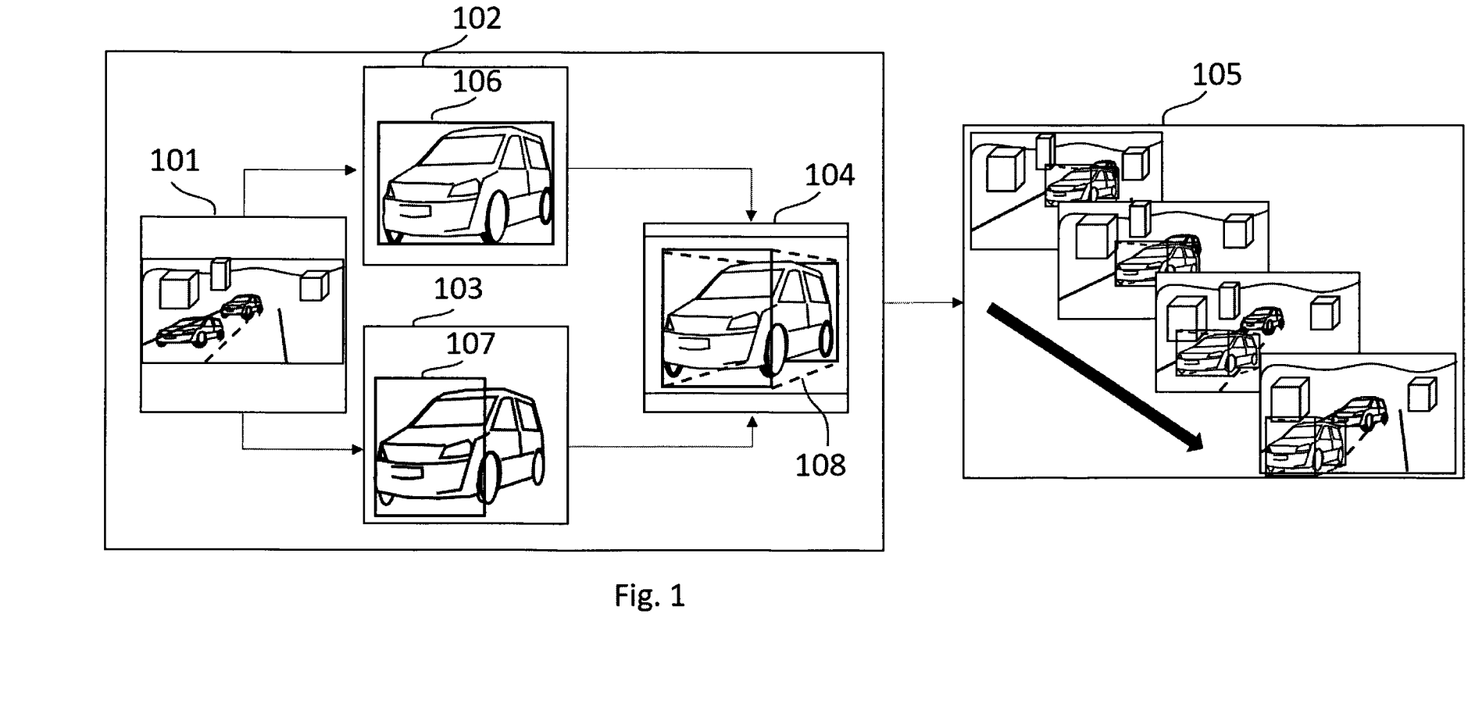
FIG. 1 shows a diagram regarding the generation of the rectangles and the 3D reconstruction according to an embodiment.

FIG. 1 provides a complete overview of the reconstruction of 3D boxes based on 2D detectors. The procedure is described below: In a first step 101, two detectors are trained to detect the total box and the front or respectively rear box (Rear_/Front_Box) in the image 101. To this end, annotations are required for the training data, which border both the complete region in the image 102 which is occupied by the vehicle with a bounding box (Total_Box 106) and border the visible region of the front and/or rear section of a vehicle with a bounding box (Rear_Front_Box 107 in image 103).

For a signed orientation estimation, it is necessary to distinguish between the front and rear box. The orientation then indicates, from the vehicle viewpoint, the nature of the side (front, rear, left or right). This information may be missing for a 3D representation.

The method can be used with any detector, for example a ResNet50, i.e. a 50-layer Residual Network Detector or a so-called "Region-based Fully Convolutional Network" (RFCN) object detector which predicts bounding boxes in image data and can output attributes for this purpose.

Figure 2:
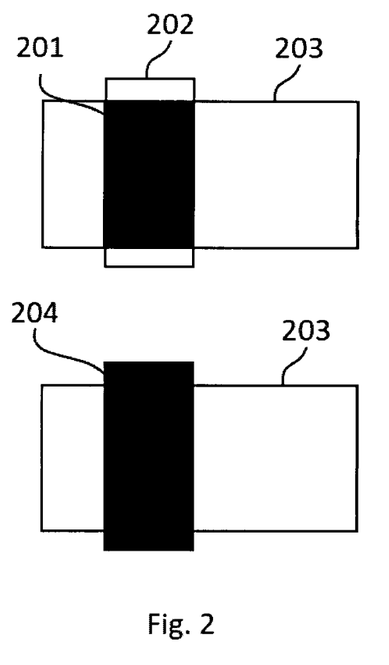
FIG. 2 shows a criterion for assigning two rectangles to one another according to an embodiment.

Since the detectors supply the x, y coordinates (i.e. height and width) of the bounding boxes 602, 603 independently of one another, a calculation of which boxes belong to a car is first required. Here, front/rear boxes 103 are assigned to the total box 102. For this purpose, as shown in FIG. 2, the metric "IoA" is calculated:

IoA=(Area_Rear_Front_Box 202 AND Area_Total_Box 203) 201/Area_Rear_Front_Box 204.

If this metric is larger than a threshold (for example 0.7), two boxes are associated with one another. This step is necessary since multiple detections for total boxes and for rear/front boxes can occur in an image. No 3D reconstruction takes place for boxes which do not have any associations. The orientation of the boxes is either lateral, front or rear side.

Figure 3:
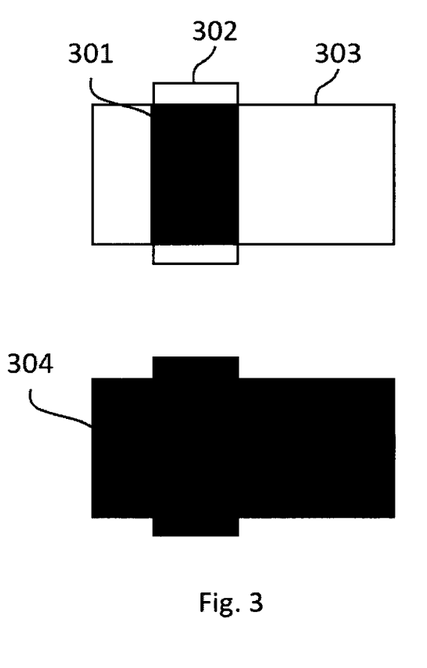
FIG. 3 shows a criterion for determining whether a side orientation can be determined according to an embodiment.

Following the association of two boxes it is determined whether a reconstruction of the 3D box is useful. For this purpose, the metric "IoU" Intersection over Union, as shown in FIG. 3, is calculated:

(Area_Rear_Front_Box 302 AND Area_Total_Box 303) 301/(Area_Rear_Front_Box 302 OR Area_Total_Box 303) 304.

If this value is less than a specified threshold, for example 0.7, a 3D box is reconstructed. Otherwise, the 3D reconstruction is error-prone, since the box detectors can be fraught with small measurement errors and this can lead to a reconstruction of the wrong vehicle side.

Since both the Rear_Front_Box detector and the Total_Box detector can supply incorrect measurements for the bounding boxes, a correction of the front/rear view is first calculated. The corrected front/rear view is the following area:

(Area_Rear_Front_Box 302 AND Area_Total_Box 303) 304.

The 3D view is subsequently reconstructed. The estimated side view joins the front/rear view and is extended so far until said side view and the front/rear view occupy the entire Total_Box. With the aid of a ground plane assumption, i.e. that the vehicle is located on a non-inclined plane, the offset of the lower rear edge from the front rear edge in the z direction (i.e. in the direction perpendicular to the areas of the boxes) can be calculated, or this offset can be determined a priori.

The various boxes which are required for the reconstruction are represented in FIG. 1:
front rear box detector 107 in image 103,
total box detector 106 in image 102,
Area_Rear_Front_Box AND Area_Total_Box 201, 301,
reconstructed 3D box 108 in image 104.

In 105, the ultimately obtained temporal sequence, e.g. a video sequence, of the reconstructions obtained is represented.

Figure 4:
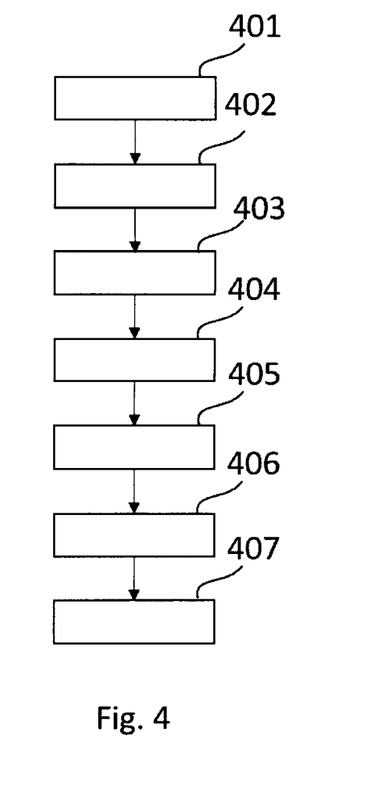
FIG. 4 shows a method according to an embodiment.

FIG. 4 shows the individual steps of an embodiment of the method for the three-dimensional graphic or pictorial reconstruction of a vehicle. First of all, an image of at least one vehicle is captured with a camera in step 401. Subsequently, a first rectangular border of the entire vehicle in the image is established in step 402, so that a first rectangle is created. Accordingly, a second rectangular border of the front face of a vehicle from the viewpoint of the camera is established in the image in step 403, such that a second rectangle is created. In step 404, it is then determined whether the first and the second rectangle are borders which relate to the same vehicle. If yes, it is determined in step 405 whether a side orientation of the vehicle can be assigned from the two rectangles. If yes, the side orientation is determined in step 406 and finally, in step 407, the three-dimensional reconstruction of the vehicle is performed from the first rectangle, the second rectangle and the side orientation.

Figure 5:
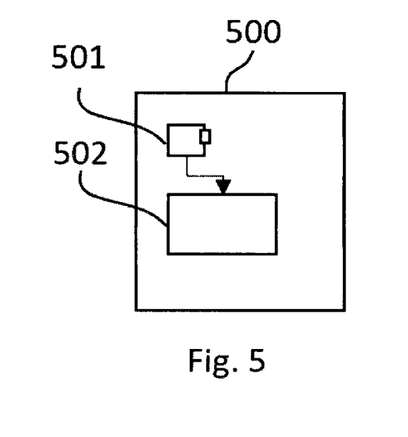
FIG. 5 shows a system according to an embodiment.

FIG. 5 shows a system 500 for the three-dimensional graphic or pictorial reconstruction of a vehicle, which has a camera 501 for capturing an image having at least one vehicle, and a computing unit 502, which may comprise at least one computer processor, for performing the method.

Figure 6:
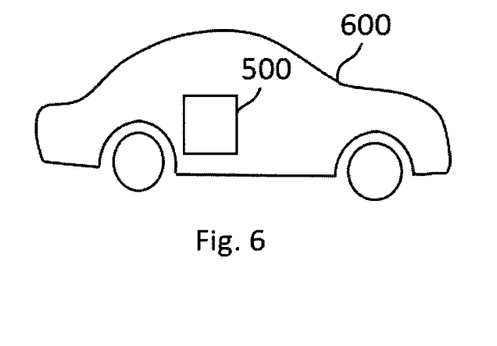
FIG. 6 shows a vehicle according to an embodiment.

FIG. 6 shows a vehicle 600 which has a system 500 as described above.

A coarse orientation estimation can be derived from the 3D reconstruction, e.g.: 0.3<IoU<0.4 corresponds to an orientation of 45° if the front section is visible.

If the camera calibration is given and a vehicle model (height, width, length) can be given or assumed, the orientation angle can be estimated based on the ground plane assumption and the theorem of intersecting lines.

Figure 7:
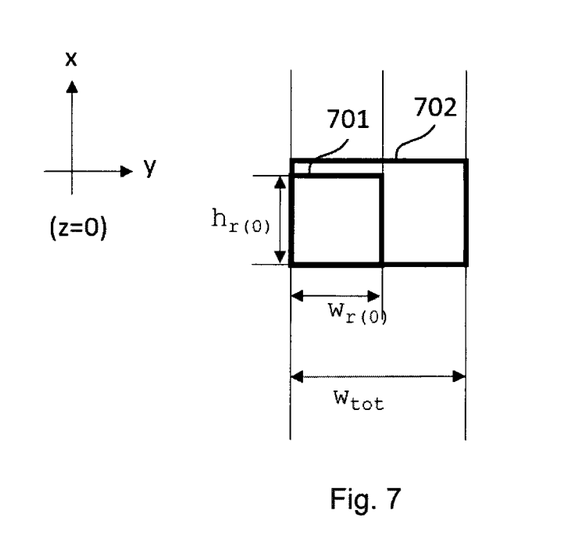
FIG. 7 shows a front view of the geometry of the rectangles according to an embodiment.
Figure 8:
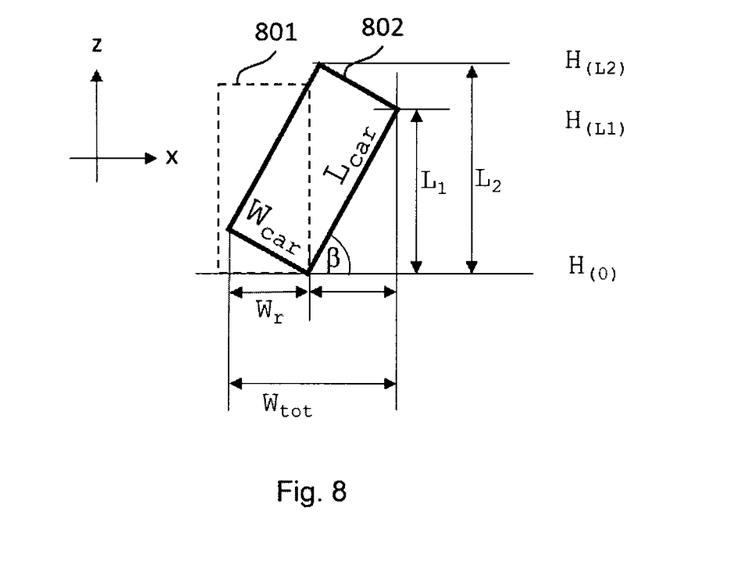
FIG. 8 shows a top view of the geometry of the rectangles according to an embodiment.
Figure 9:
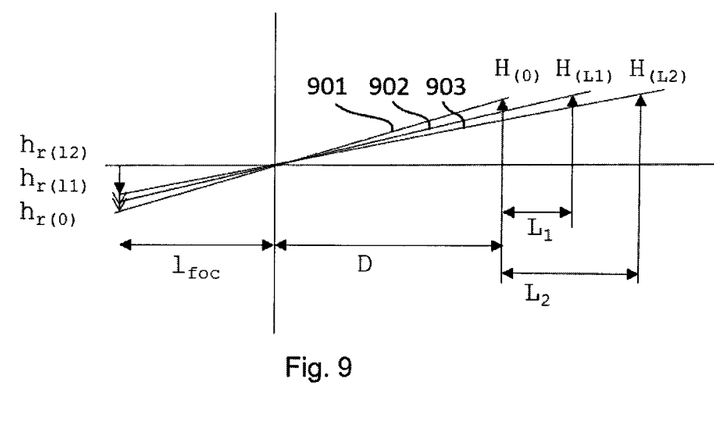
FIG. 9 shows the relationship of the real heights of the vehicle to the heights of the vehicle depicted in the image according to an embodiment.

An exemplary approach of how the orientation can be estimated and how the rear box or respectively rear rectangle from the viewpoint of the camera can be calculated is shown in FIGS. 7-9. FIG. 7 shows a front view of the geometry of the front rectangle 701 and the entire rectangle 702 in the x-y plane where z=0, i.e. the plane lies in the plane of the front rectangle. In FIGS. 7-9, variables having lower case letters represent variables in the image domain. The units are e.g. pixels.

Variables having capital letters represent variables of the real environment. The unit is e.g. meters.

The front rectangle 701 has a height $h_{r(0)}$ where z=0 and a width $w_{r(0)}$. The entire rectangle 702 has a width $w_{tot}$.

FIG. 8 shows a plan view of the geometry of the rectangles 701, 702, which are represented from above as a vehicle rotated about an angle β which is likewise represented as a rectangle. The sizes are, as per FIG. 7, only in sizes of the real environment:

$W_{car}$ . . . width of the vehicle [m]
$W_r$ . . . visible width of the front side of the vehicle [m]
$W_{tot}$ . . . visible width and length of the vehicle [m]
$L_{car}$ . . . length of the vehicle [m]
$H_{car}$ . . . height of the vehicle [m]
$L_1$ . . . distance between the front rectangle and the rear rectangle
$L_2$ . . . distance between the front rectangle and the rear rectangle including offset due to the rotation.
$H_{(0)}$, $H_{(L1)}$, $H_{(L2)}$ represent the height of the vehicle where z=0, z=$L_1$, z=$L_2$.
$W_{car}$=2 m
$L_{car}$=5 m
$H_{car}$=1.8 m
$H_{car}$=$H_{(0)}$=$H_{(L1)}$=$H_{(L2)}$ The relationship between meters and pixels can be determined e.g. by means of the ratio of the height $h_{r(0)}$ to $H_0$.

The orientation angle β can then be determined from the relationships $$\sin(\beta)=W_r/W_{car} \rightarrow \beta \text{ or}$$

$$W_{tot}-W_r=L_{car}\cos(\beta).$$

$L_1$ and $L_2$ can be calculated to give $$L_1=L_{car}\sin(\beta)$$

$$L_2=L+W_{car}\cos(\beta)$$

FIG. 9 shows how the distance D as well as $h_{r(l1)}$, $h_{r(l2)}$ and $w_{(l1)}$, $w_{(l2)}$ can be established by means of the theorem of intersecting lines and the known quantities $h_{r(0)}$, $L_1$, $L_2$, $H_{(0)}$, $H_{(L1)}$, $H_{(L2)}$ as well as the focal length $l_{foc}$ of the camera:

D is determined from $D/H_{(0)}=l_{foc}/h_{r(0)}$.
$h_{r(l1)}$ is the result of $D+L_1/H_{(L1)}=l_{foc}/h_{r(l1)}$.
$h_{r(l2)}$ is the result of $D+L_2/H_{(L2)}=l_{foc}/h_{r(l2)}$.

Finally, $W_{(l1)}$ and $w_{(l2)}$ are the result of the ratio $h_{r(0)}/h_{r(l1)}$ or respectively $h_{r(0)}/h_{r(l2)}$.

This estimation can be refined by means of a so-called expectation-maximization algorithm which is known to the person skilled in the art. With this algorithm, a solution with initial estimated values is calculated iteratively, and the solution is then introduced as more accurate estimated values into the new initialization in a further iteration. This is therefore more computation-intensive regarding the run time.

The invention claimed is:

1. A method for three-dimensional pictorial reconstruction of a vehicle, comprising the steps:
   a) with a camera, capturing an image of at least one vehicle;
   b) in the image, capturing a first rectangular border of an entirety of a vehicle among the at least one vehicle, and obtaining a first rectangle based on the first rectangular border;
   c) in the image, capturing a second rectangular border of one side of a vehicle among the at least one vehicle, and obtaining a second rectangle based on the second rectangular border;
   d) determining whether the first rectangular border and the second rectangular border both relate to the same vehicle among the at least one vehicle;
   e) when it is determined that the first rectangular border and the second rectangular border both relate to the same vehicle among the at least one vehicle, then determining whether a side orientation of the vehicle can be determined from the first and second rectangles;
   f) when it is determined that the side orientation can be determined, then determining the side orientation of the vehicle from the first and second rectangles;
   g) performing a three-dimensional reconstruction of the vehicle from the first rectangle, the second rectangle and the side orientation; and
   further comprising at least one of:
   a first feature, wherein the step d) comprises calculating a first ratio of a common area of the first rectangle and the second rectangle relative to an area of the second rectangle, and then determining that the first rectangular border and the second rectangular border both relate to the same vehicle in response to the first ratio exceeding a first threshold, and/or
   a second feature, wherein the step e) comprises calculating a second ratio of the common area of the first rectangle and the second rectangle relative to a sum of a first area of the first rectangle and a second area of the second rectangle, and then determining that the side orientation can be determined in response to the second ratio falling below a second threshold.

2. The method according to claim 1, comprising the first feature.

3. The method according to claim 1, comprising the second feature.

4. The method according to claim 1, wherein the step g) comprises:
   determining a rear face or a front face of the vehicle from a viewpoint of the camera by a projection of the front face or the rear face, wherein a direction of the projection is determined dependent on the side orientation that has been determined, and
   determining at least one lateral face of the vehicle by connecting corners of the front face or the rear face respectively to corners of the rear face or the front face.

5. A system for performing the method according to claim 1, comprising:
   a camera configured to perform the step a) of the method, and
   a computing unit configured to perform the steps b) to g) as well as the first feature and/or the second feature of the method.

6. A vehicle comprising a vehicle body and the system according to claim 5.

7. A method for three-dimensional pictorial reconstruction of a vehicle, comprising the steps:
   a) with a camera, capturing an image of at least one vehicle;
   b) in the image, capturing a first rectangular border of an entirety of a vehicle among the at least one vehicle, and obtaining a first rectangle based on the first rectangular border;
   c) in the image, capturing a second rectangular border of one side of a vehicle among the at least one vehicle, and obtaining a second rectangle based on the second rectangular border;
   d) determining whether the first rectangular border and the second rectangular border both relate to the same vehicle among the at least one vehicle;
   e) when it is determined that the first rectangular border and the second rectangular border both relate to the same vehicle among the at least one vehicle, then determining whether a side orientation of the vehicle can be determined from the first and second rectangles;
   f) when it is determined that the side orientation can be determined, then determining the side orientation of the vehicle from the first and second rectangles;
   g) performing a three-dimensional reconstruction of the vehicle from the first rectangle, the second rectangle and the side orientation; and
   h) determining a rear face or a front face of the vehicle comprising determining, in the image, an angle between a lower edge of a front rectangle or a rear rectangle of an adjacent line of a lower corner of the front rectangle or the rear rectangle and a corresponding corner of the rear rectangle or the front rectangle respectively.

8. A method for three-dimensional pictorial reconstruction of a vehicle, comprising the steps:
   a) with a camera, capturing an image of at least one vehicle;
   b) in the image, capturing a first rectangular border of an entirety of a vehicle among the at least one vehicle, and obtaining a first rectangle based on the first rectangular border;
   c) in the image, capturing a second rectangular border of one side of a vehicle among the at least one vehicle, and obtaining a second rectangle based on the second rectangular border;
   d) determining whether the first rectangular border and the second rectangular border both relate to the same vehicle among the at least one vehicle;
   e) when it is determined that the first rectangular border and the second rectangular border both relate to the same vehicle among the at least one vehicle, then determining whether a side orientation of the vehicle can be determined from the first and second rectangles;
   f) when it is determined that the side orientation can be determined, then determining the side orientation of the vehicle from the first and second rectangles;
   g) performing a three-dimensional reconstruction of the vehicle from the first rectangle, the second rectangle and the side orientation; and
   h) determining a rear face or a front face of the vehicle comprising calculating a height of a rear rectangle or a front rectangle in the image, wherein the height is calculated by setting a ratio of a focal length of the camera relative to a length of a lateral rectangular edge of the first rectangle or the second rectangle in the image equal to a ratio of a distance of the camera from the vehicle relative to an estimated real front height or an estimated real rear height of the vehicle.

* * * * *

UNITED STATES PATENT AND TRADEMARK OFFICE
CERTIFICATE OF CORRECTION

PATENT NO. : 11,132,530 B2
APPLICATION NO. : 16/508744
DATED : September 28, 2021
INVENTOR(S) : Michelle Karg et al.

Page 1 of 1

It is certified that error appears in the above-identified patent and that said Letters Patent is hereby corrected as shown below:

In the Specification

Column 2,
Line 30, after "from" replace "₁he" with --the--;
Line 39, after "can" delete --as--;

Column 7,
Line 16, after "FIGS. 7-9." insert a paragraph break;
Line 59, replace the equation to read: --$L_2 = L_1 + W_{car} \cos(\beta)$--;
Line 66, after "the result of" replace the equation to read: --$D + L_1/H_{(L1)} = l_{foc}/h_{r(11)}$.--.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*